United States Patent
Choi et al.

(10) Patent No.: US 7,359,014 B2
(45) Date of Patent: Apr. 15, 2008

(54) LIQUID CRYSTAL DISPLAY DEVICE AND METHOD FOR FABRICATING THE SAME

(75) Inventors: Kee Seok Choi, Kyongnangbuk-do (KR); Jin Ha Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 42 days.

(21) Appl. No.: 10/964,969

(22) Filed: Oct. 15, 2004

(65) Prior Publication Data

US 2005/0105017 A1 May 19, 2005

(30) Foreign Application Priority Data

Nov. 12, 2003 (KR) ............... 10-2003-0079820

(51) Int. Cl.
*G02F 1/1335* (2006.01)

(52) U.S. Cl. ............... 349/106; 349/110; 349/122; 349/187

(58) Field of Classification Search ........... 349/106, 349/108, 110, 111, 122, 138, 187; 430/7, 430/20, 321; 359/891; 428/1.1, 1.3

See application file for complete search history.

(56) References Cited

U.S. PATENT DOCUMENTS 6,671,025 B1 * 12/2003 Ikeda et al. ............ 349/156
6,734,931 B2 * 5/2004 Yu ............................ 349/106
2003/0063238 A1 * 4/2003 Yi et al. .................... 349/106

FOREIGN PATENT DOCUMENTS

| JP | 06-202101 | 7/1994 |
|---|---|---|
| JP | 06-308313 | 11/1994 |
| JP | 10-104606 | 4/1998 |
| JP | 10-301101 | 11/1998 |
| JP | 11-038219 | 12/1999 |

* cited by examiner

*Primary Examiner*—Toan Ton
*Assistant Examiner*—Tai Duong
(74) *Attorney, Agent, or Firm*—Morgan, Lewis & Bockius LLP

(57) ABSTRACT

A liquid crystal display (LCD) device includes a first substrate including a plurality of first regions and second regions, the first and second regions not overlapping each other, a black matrix layer formed on the first substrate in the second regions, a plurality of first color filter layers formed in the first regions and overlapping edges of the black matrix layer, and a plurality of second color filter layers formed on the black matrix layer, each of the second color filter layers between the adjacent first color filter layers.

24 Claims, 10 Drawing Sheets

LIQUID CRYSTAL DISPLAY DEVICE AND METHOD FOR FABRICATING THE SAME

The present application claims the benefit of Korean Patent Application No. P2003-79820 filed in Korea on Nov. 12, 2003, which is hereby incorporated by reference.

BACKGROUND OF THE INVENTION

1. Field of the Invention

The present invention relates to a liquid crystal display (LCD) device, and more particularly, to an LCD device and a method for fabricating the same that decrease a step coverage between color filter layers.

2. Discussion of the Related Art

Demands for display devices have increased with development of an information society. Accordingly, many efforts have been made to research and develop various flat display devices, such as liquid crystal display (LCD), plasma display panel (PDP), electro-luminescent display (ELD), and vacuum fluorescent display (VFD). In particular, liquid crystal display (LCD) devices have been most widely used as a substitute for a cathode ray tube (CRT) because of their advantageous characteristics of thin profile, lightness, and low power consumption. LCD devices have been implemented as display devices for notebook computers, desktop computers, televisions, and the like. One consideration in developing LCD devices is to develop LCD devices having a high quality picture, such as high resolution and high luminance with a large-sized screen, while maintaining lightness, thin profile, and low power consumption.

In general, the LCD device includes an LCD panel for displaying an image and a driver for supplying a driving signal to the LCD panel. In addition, the LCD panel includes first and second substrates attached to each other with a cell gap therebetween, and a liquid crystal layer formed in the cell gap. Further, alignment layers are respectively formed on facing surfaces of the first and second substrates, wherein the alignment layers are rubbed to align the liquid crystal layer.

The first substrate or a TFT array substrate includes a plurality of gate lines arranged along a first direction, a plurality of data lines arranged along a second direction perpendicular to the first direction, a plurality of pixel electrodes arranged in a matrix-type configuration within pixel regions defined by the crossings of the gate and data lines, and a plurality of thin film transistors for switching signals from the data lines to the pixel electrodes based on signals received from the gate lines.

Further, the second substrate or a color filter array substrate includes a black matrix layer, a color filter layer, and a common electrode. The color filter layer includes red, green, and blue color filters, wherein the color filter layer is formed by repetitively positioning the color filters in order of red(R), green(G), and blue(B) within regions corresponding to the pixel regions of the first substrate. Accordingly, the liquid crystal layer controls the intensity of light, and the light passes through the color filter layers of red(R), green (G), and blue(B) to represent color images.

Generally, the color filter layer may be formed in a dye method, a pigment dispersion method, an electro-deposition method, or a print method. In the dye method, an exposure and developing process is applied to a dyeable and photosensitive resin on a substrate, and then a dyeing process is performed thereto with a dyestuff. The pigment dispersion method is classified into one of two types. The first type of pigment dispersion method includes performing an exposure and developing process after depositing a photosensitive substance to which pigment is dispersed. Further, the second type of pigment dispersion method includes etching a polyimide substance having no photosensitivity to which pigment is dispersed using a photoresist.

In the electro-deposition method, a highly polymerized resin is dissolved or dispersed from a solvent, and then extracted to an electrode by electrochemistry. Moreover, the print method prints inks to which a pigment is dispersed onto a resin.

FIG. 1A to FIG. 1D are cross-sectional views illustrating a method for fabricating a color filter substrate according to the related art. In FIG. 1A, chrome/chrome oxide or chrome/chrome nitride/chrome oxide is deposited to form a first layer on an entire surface of a substrate 11 by sputtering. Then, the first layer is patterned by photolithography to form the black matrix layer 12 on the substrate 11 except in regions P1, P2, and P3.

As shown in FIG. 1B, a first color resin 13 is coated on the entire surface of the substrate 11. Then, a mask M is positioned above the first color resin 13, and ultraviolet (UV) rays is irradiated onto the first color resin 13 through the mask M, to thereby selectively expose the first color resin 13. In particular, the mask M includes opening portions corresponding to the region P1. These opening portions have a width the same as a width of the region P1.

As shown in FIG. 1C, portions of the first color resin 13 (shown in FIG. 1B) is removed to form a color filter 13c in the region P1. In particular, portions of the color resin 13 that are along the edges of the black matrix layer 12 (shown in FIG. 1B) are irradiated by the ultraviolet rays due to diffraction and interference of the ultraviolet rays caused by edges of the mask's opening portions. Thus, the color filter 13c overlaps the black matrix layer 12 along the edges of the black matrix layer 12, thereby forming an uneven substrate surface.

Although not shown, second and third color resins subsequently are coated and are selectively removed, as shown in FIGS. 1B and 1C. Thus, as shown in FIG. 1D, a color filter 14c is formed in the region P2, and a color filter 15c is formed in the first region P3. As a result, a step coverage d occurs between the color filters 13c, 14c, and 15c, thereby causing a similar step coverage in an alignment layer 16, which is subsequently formed on the color filters 13c, 14c, and 15c. Accordingly, when rubbing the alignment layer 16, the alignment layer 16 corresponding to the step coverage d is not rubbed, thereby causing light leakage and reducing image quality.

SUMMARY OF THE INVENTION

Accordingly, the present invention is directed to a liquid crystal display device and a method for fabricating the same that substantially obviate one or more of the problems due to limitations and disadvantages of the related art.

An object of the present invention is to provide an LCD device and a method for fabricating the same that decrease a step coverage between color filters.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the liquid crystal display (LCD) device includes a first substrate including a plurality of first regions and second regions, the first and second regions not overlapping each other, a black matrix layer formed on the first substrate in the second regions, a plurality of first color filter layers formed in the first regions and overlapping edges of the black matrix layer, and a plurality of second color filter layers formed on the black matrix layer, each of the second color filter layers between the adjacent first color filter layers.

In another aspect, the liquid crystal display (LCD) device includes a first substrate including a plurality of first regions and second regions, the first and second regions not overlapping each other, a black matrix layer formed on the first substrate in the second regions, and a plurality of color filter layers formed in the first regions and overlapping the black matrix layer, the adjacent color filters contacting one another on the black matrix layer.

In another aspect, the method for fabricating a liquid crystal display (LCD) device includes preparing a substrate including a plurality of first regions and second regions, the first and second regions not overlapping each other, forming a black matrix layer on the substrate in the second regions, forming a plurality of first color filter layers in the first regions and overlapping edges of the black matrix layer, and forming a plurality of second color filter layers on the black matrix layer, each of the second color filter layers being between the adjacent first color filter layers.

In another aspect, the method for fabricating a liquid crystal display (LCD) device includes preparing a substrate including a plurality of first regions and second regions, the first and second regions not overlapping each other, forming a black matrix layer on the substrate in the second regions, and forming a plurality of color filters in the first regions and overlapping the black matrix layer, the adjacent color filters contacting one another on the black matrix layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1A:
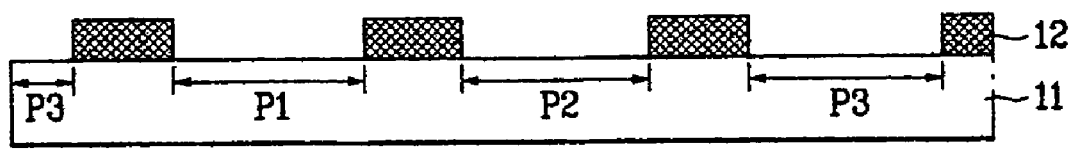
FIG. 1A to FIG. 1D are cross-sectional views illustrating a method for fabricating a color filter substrate according to the related art.
Figure 1B:
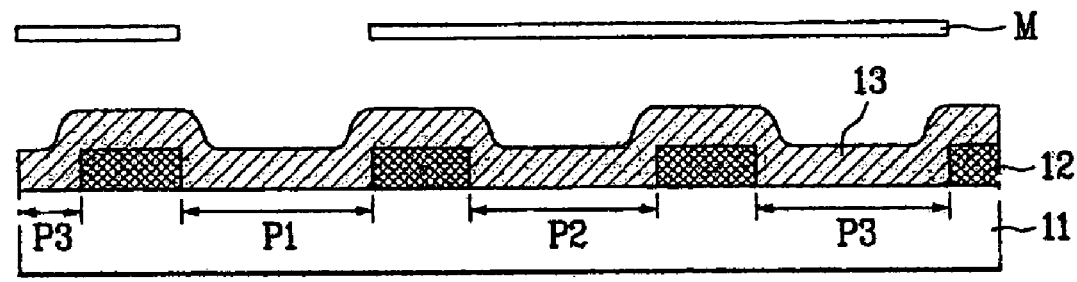
Figure 1C:
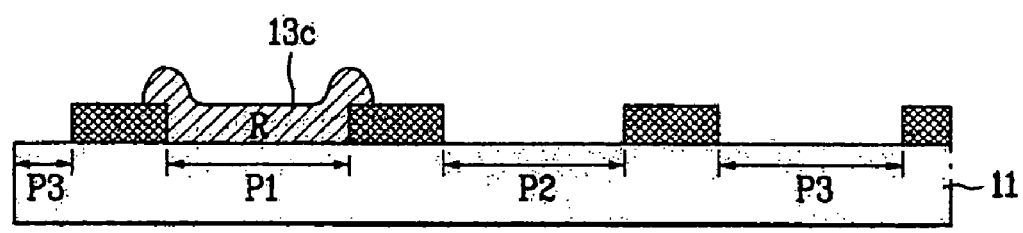
Figure 1D:
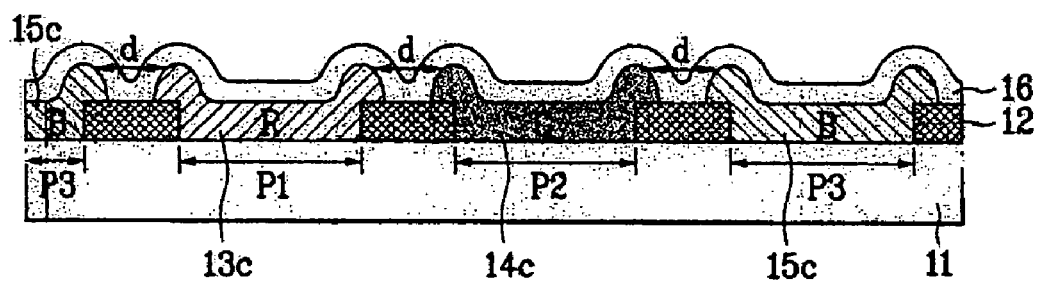
Figure 2:
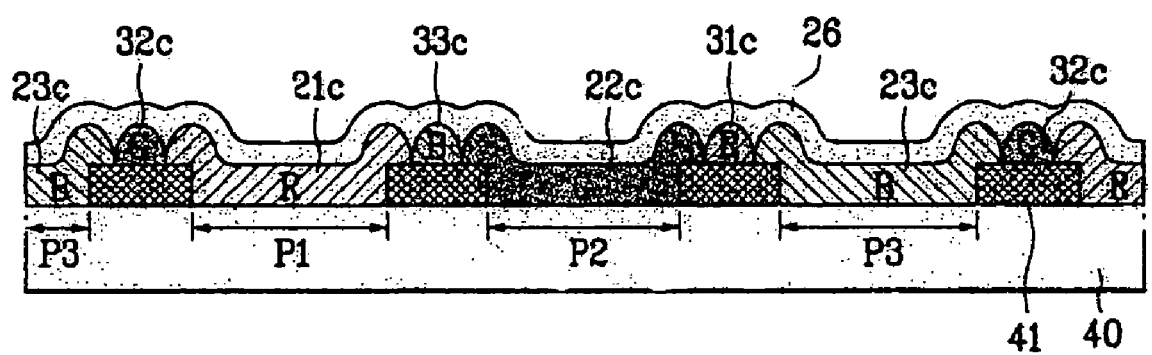
FIG. 2 is a cross-sectional view of an LCD device according to an embodiment of the present invention.

FIG. 2 is a cross-sectional view of an LCD device according to an embodiment of the present invention. In FIG. 2, a LCD device may include a substrate 40. The substrate 40 may include a plurality of first regions P1, P2, and P3 corresponding to pixel regions of another substrate (not shown) that is attached thereto.

In addition, a black matrix layer 41, first color filters 21c, 22c, and 23c, and second color filters 31c, 32c, and 33c may be formed on the substrate 40. The black matrix layer 41 may be formed on the substrate 40 except in the first regions P1, P2, and P3. Further, the first color filters 21c, 22c, and 23c may be formed in the first regions P1, P2, and P3 and may overlap the black matrix layer 41 along edges of the black matrix layer 41. Moreover, the second color filters 31c, 32c, and 33c may be formed on the black matrix layer 41 except where the black matrix layer 41 overlapping the first color filters 21c, 22c, and 23c.

Further, the first color filter 21c may include a red color filter R and may be formed in the first region P1. The first color filter 22c may include a green color filter G and may be formed in the first region P2. The first color filter 23c may include a blue color filter B and may be formed in the third pixel region P3. In addition, the second color filter 31c may include a red color filter R, and may be formed on regions of the black matrix layer 41 that are between the first color filters 22c and 23c. The second color filter 32c may include a green color filter G, and may be formed on another regions of the black matrix 41 that are between the first color filters 21c and 23c. The second color filter 33c may include a blue color filter B, and may be formed on another regions of the black matrix 41 that are between the first color filters 21c and 22c. That is, each of the second color filters 31c, 32c, and 33c may be formed between two of the first color filters 21c, 22c, and 23c that have different color filters from itself.

As a result, a step coverage between color filters may be reduced corresponding to a width of the second color filter 31c, 32c, and 33c, thereby providing a more even surface for forming an alignment layer 26 thereon. In addition, although not shown, the substrate 40 may be a color filter substrate and may be attached to a TFT array substrate sandwiching a liquid crystal material.

Figure 3A:
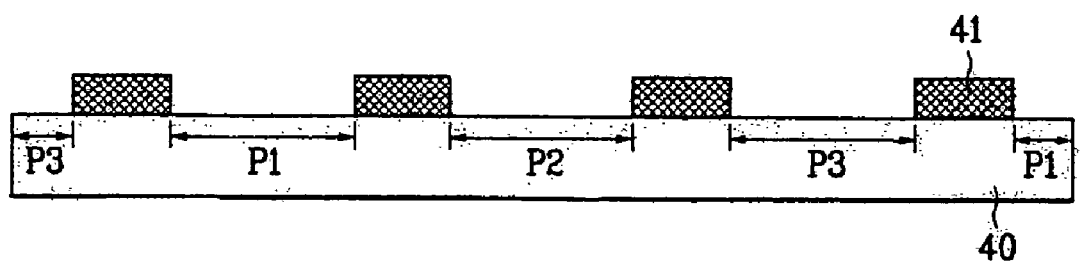
FIG. 3A to FIG. 3I are cross-sectional views illustrating a method for fabricating an LCD device according to another embodiment of the present invention.

FIG. 3A to FIG. 3G are cross-sectional views illustrating a method for fabricating an LCD device according to another embodiment of the present invention. In FIG. 3A, chrome/chrome oxide, chrome/chrome nitride/chrome oxide, or the like may be deposited to form a first layer on an entire surface of the substrate 40 by sputtering. Then, the first layer may be patterned by photolithography to form the black matrix layer 41 on the substrate 40 except in the first regions P1, P2, and P3.

Figure 3B:
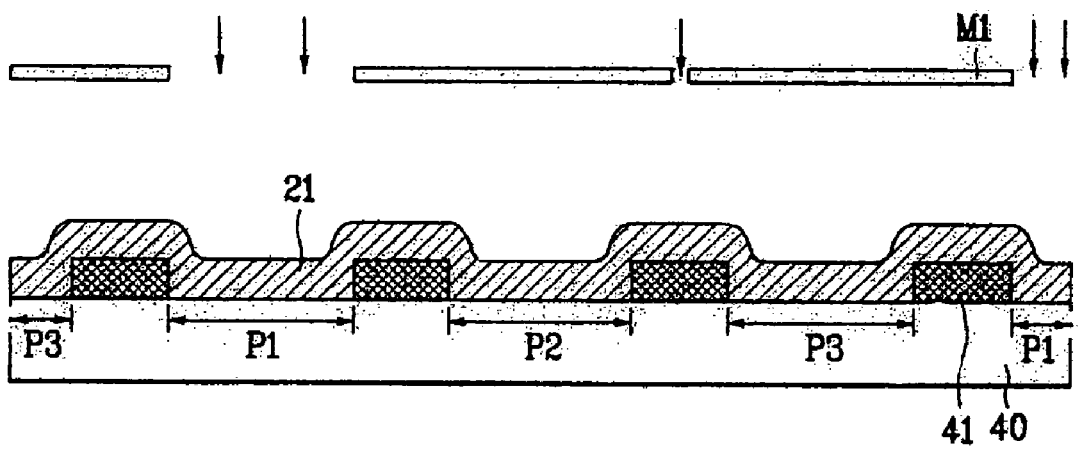

As shown in FIG. 3B, a first color resin 21 may be coated on the entire surface of the substrate 40. Then, a first mask M1 may be positioned above the first color resin 21, and ultraviolet (UV) rays may be irradiated onto the first color resin 21 through the first mask M1 to selectively expose the first color resin 21. In particular, the first mask M1 may include first opening portions corresponding to the first region P1 and second opening portions corresponding to center portions of the black matrix layer 41 that are between the first regions P2 and P3. The second opening portions may be narrower than the first opening portions.

Figure 3C:
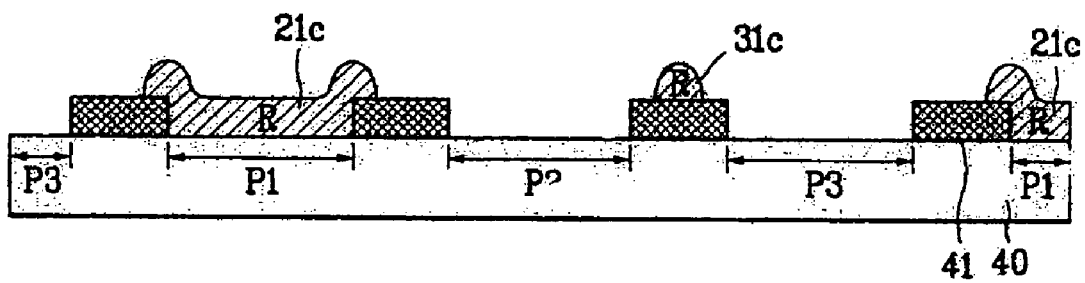

As shown in FIG. 3C, portions of the first color resin 21 (shown in FIG. 3B) may be selectively removed to form the first color filter 21c in the first region P1, and the second color filter 31c on the regions of the black matrix layer 41 that are between the first regions P2 and P3. In particular, the first color filter 21c may overlap with the black matrix layer 41 along the edges of the black matrix layer 41 due to a diffraction of the UV rays, and the second color filter 31c may be formed at a center of the regions of the black matrix layer 41 between the first regions P2 and P3.

Figure 3D:
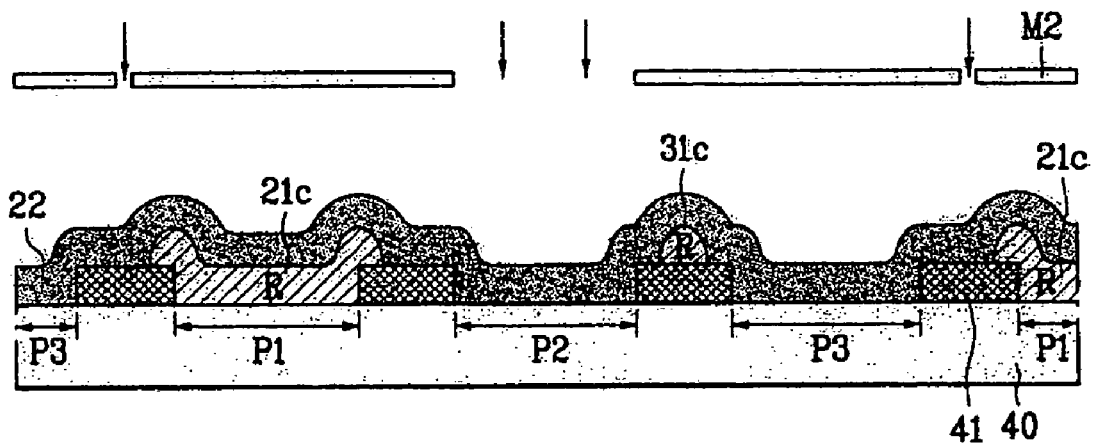

As shown in FIG. 3D, a second color resin 22 may be coated on the entire surface of the substrate 40. Then, a second mask M2 may be positioned above the second color resin 22, and UV rays may be irradiated onto the second color resin 22 through the second mask M2 to selectively expose the second color resin 22. In particular, the second mask M2 may include first opening portions corresponding to the first region P2 and second opening portions corresponding to center portions of the black matrix layer 41 that are between the first regions P1 and P3. The second opening portions may be narrower than the first opening portions.

Figure 3E:
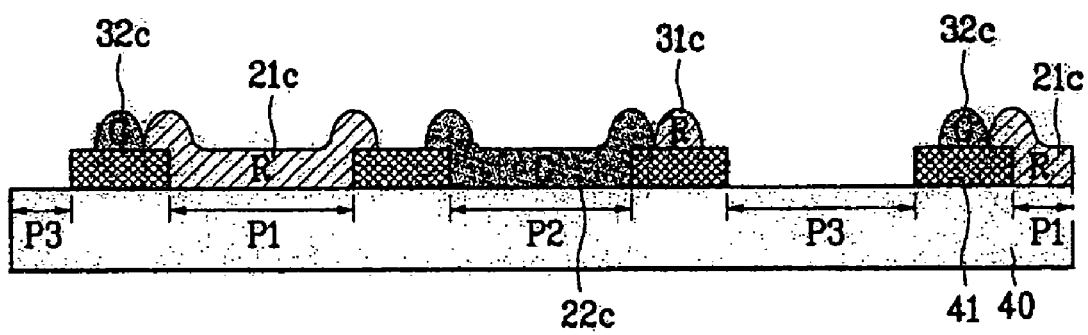

As shown in FIG. 3E, portions of the second color resin 22 (shown in FIG. 3D) may be selectively removed to simultaneously form the first color filter 22c in the first region P2 and the second color filter 32c on the regions of the black matrix layer 41 between the first regions P1 and P3. In particular, the first color filter 22c may overlap with the black matrix layer 41 along the edges of the black matrix layer 41 due to a diffraction of the UV rays, and the second color filter 32c may be formed at a center of the regions of the black matrix layer 41 between the first regions P1 and P3.

Figure 3F:
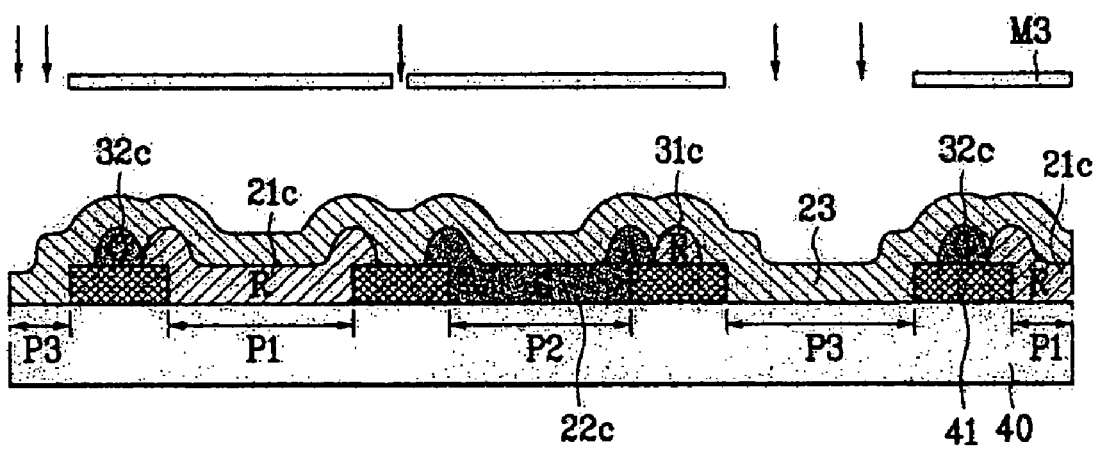

As shown in FIG. 3F, a third color resin 23 may be coated on the entire surface of the substrate 40. Then, a third mask M3 may be positioned above the third color resin 23, and UV rays may be irradiated onto the third color resin 23 through the third mask M3 to selectively expose the third color resin 23. In particular, the third mask M3 may include first opening portions corresponding to the first region P3 and second opening portions corresponding to center portions of the black matrix layer 41 between the first regions P1 and P2. The second opening portions may be narrower than the first opening portions.

Figure 3G:
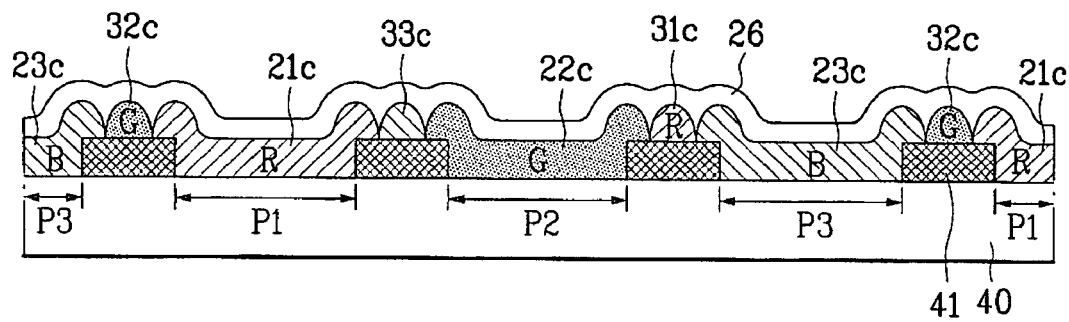

As shown in FIG. 3G, portions of the third color resin 23 (shown in FIG. 3F) may be selectively removed to simultaneously form the first color filter 23c in the first region P3 and the second color filter 33c on the regions of the black matrix layer 41 between the first regions P1 and P2. In particular, the first color filter 23c may overlap with the black matrix layer 41 along the edges of the black matrix layer 41 due to a diffraction of the UV rays, and the second color filter 33c may be formed at a center of the regions of the black matrix layer 41 between the first regions P1 and P2.

Figure 3H:
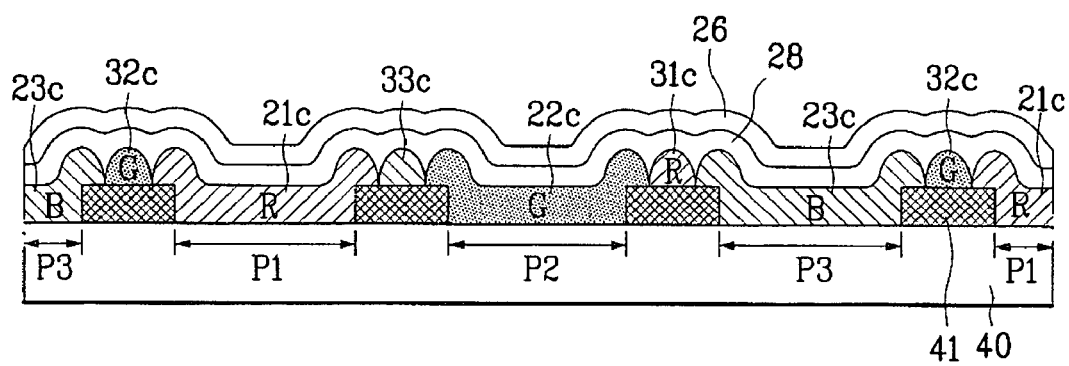
Figure 3I:
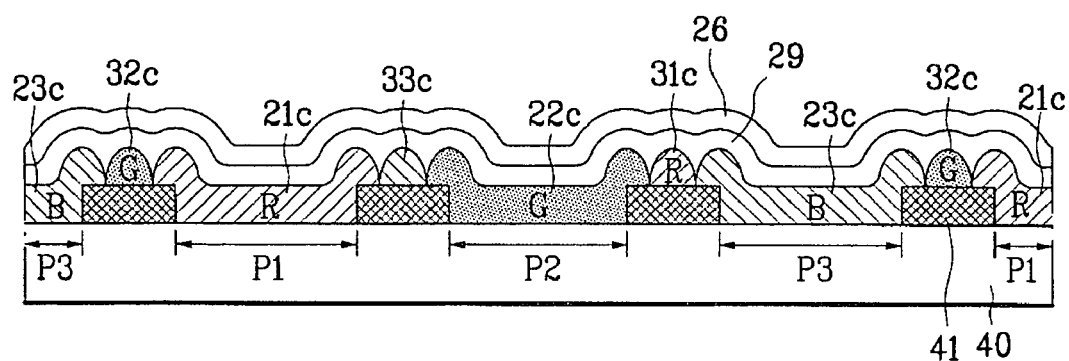

As a result, each of the second color filters 31c, 32c, and 33c may be formed on the centers of the black matrix layer 41 between the first regions P1, P2, and P3, thereby decreasing the step coverage in the first color filters 21c, 22c, and 23c. In addition, color filters of different colors may be formed adjacent to one another. Further, an alignment layer 26 may be formed on a more even surface over the color filters 21c, 22c, 23c, 31c, 32c and 33c. In an exemplary embodiment, a common electrode 28 may be first formed on the substrate 40 covering the color filters 21c, 22c, 23c, 31c, 32c and 33c, and the alignment layer 26 may then be formed on the substrate 40 covering the common electrode 28 as shown in FIG. 3H. Alternatively, instead of the common electrode 28, an overcoating layer 29 may be formed between the color filters 21c, 22c, 23c, 31c, 32c and 33c and the alignment layer 26 as shown in FIG. 3I.

Figure 4:
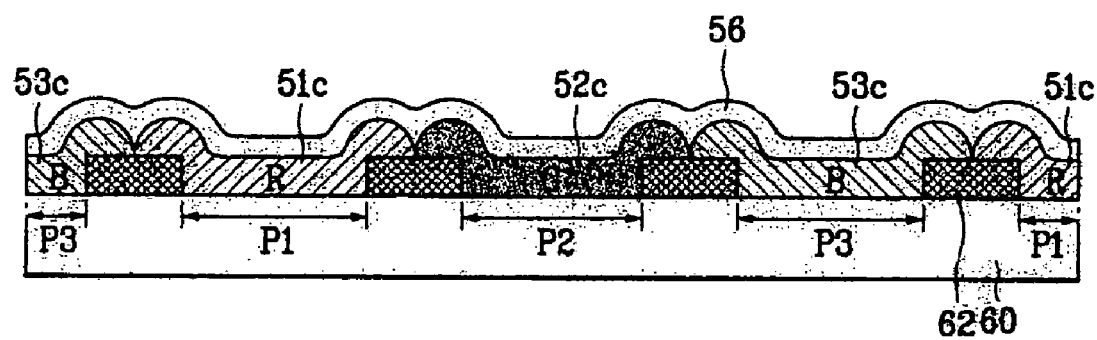
FIG. 4 is a cross-sectional view of an LCD device according to another embodiment of the present invention.

FIG. 4 is a cross-sectional view of an LCD device according to another embodiment of the present invention. As shown in FIG. 4, a LCD device may include a substrate 60. The substrate 60 may include a plurality of first regions P1, P2, and P3 corresponding to pixel regions of another substrate (not shown) that is attached thereto.

In addition, a black matrix layer 62 and color filters 51c, 52c, and 53c may be formed on the substrate 60. The black matrix layer 42 may be formed on the substrate 60 except in the first regions P1, P2, and P3. Further, the color filters 51c, 52c, and 53c may be formed in the first regions P1, P2, and P3 and may overlap the black matrix layer 41. The overlapping portions may extend to centers of the black matrix layer 62.

The color filter 51c may include a red color filter R and may be formed in the first region P1. The color filter 52c may include a green color filter G and may be formed in the first region P2. The color filter 53c may include a blue color filter B and may be formed in the third pixel region P3. In particular, the red color filter 51c may contact the neighboring green color filter 52c and the neighboring blue color filter 53c at the centers of the black matrix layer 62. Also, the green color filter 52c may contact the neighboring red color filter 51c and the neighboring blue color filter 53c at the centers of the black matrix layer 62.

As a result, the color filters 51c, 52c, and 53c may contact with one another at the centers of the black matrix layer 62, thereby decreasing a step coverage between the color filters. An alignment layer 56 may then be formed on the color filters 51c, 52c and 53c. In addition, although not shown, the substrate 60 may be a color filter substrate and may be attached to a TFT array substrate sandwiching a liquid crystal material.

Figure 5A:
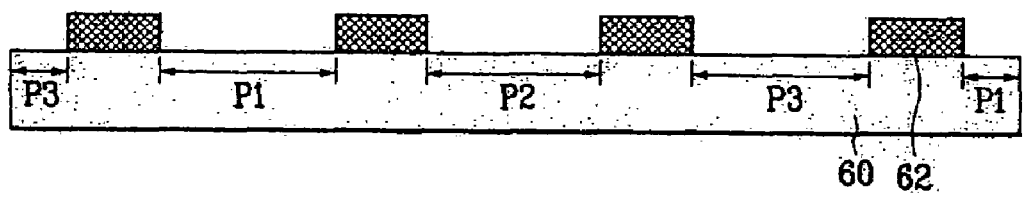
FIG. 5A to FIG. 5I are cross-sectional views illustrating a method for fabricating an LCD device according to another embodiment of the present invention.

FIG. 5A to FIG. 5G are cross-sectional views illustrating a method for fabricating an LCD device according to another embodiment of the present invention. In FIG. 5A, chrome/chrome oxide, chrome/chrome nitride/chrome oxide, or the like may be deposited to form a first layer on an entire surface of the substrate 60 by sputtering. Then, the first layer may be patterned by photolithography to form the black matrix layer 62 on the substrate 60 except in the first regions P1, P2, and P3.

Figure 5B:
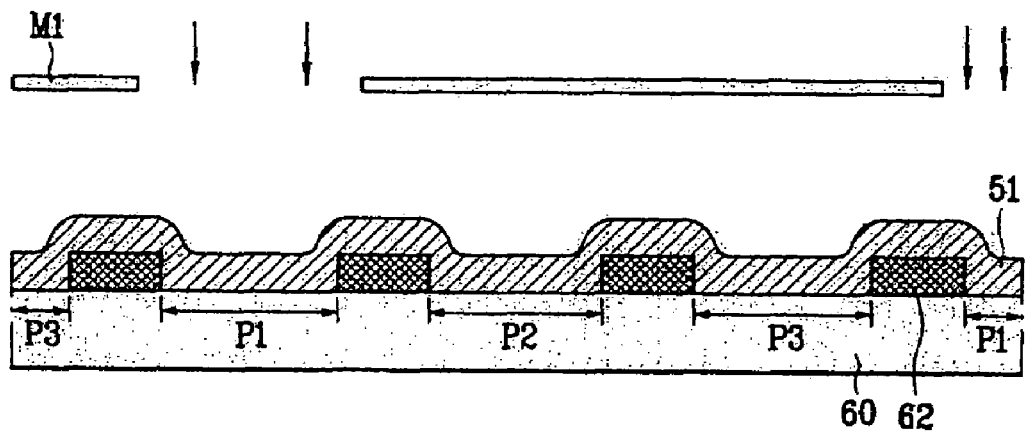

As shown in FIG. 5B, a first color resin 51 may be coated on the entire surface of the substrate 60. Then, a first mask M1 may be positioned above the first color resin 51, and ultraviolet (UV) rays may be irradiated onto the first color resin 51 through the first mask M1 to selectively expose the first color resin 51. In particular, the first mask M1 may include opening portions corresponding to the first region P1. The opening portions may have a width larger than a width of the first region P1.

Figure 5C:
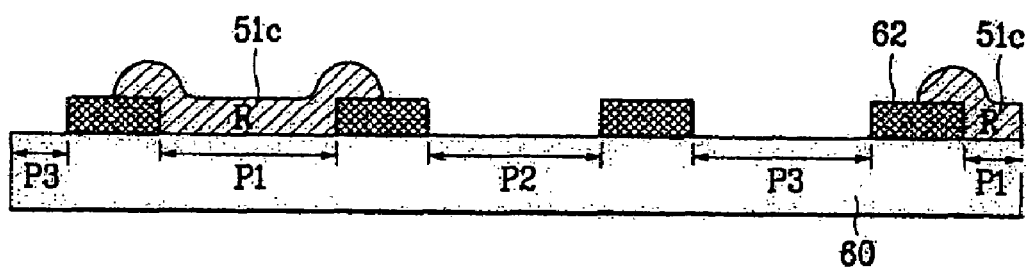

As shown in FIG. 5C, portions of the first color resin 51 (shown in FIG. 5B) may be selectively removed to form the color filter 51c in the first region P1. In particular, the color filter 51c may overlap with the black matrix layer 62 and may extend to a center of the black matrix layer 62.

Figure 5D:
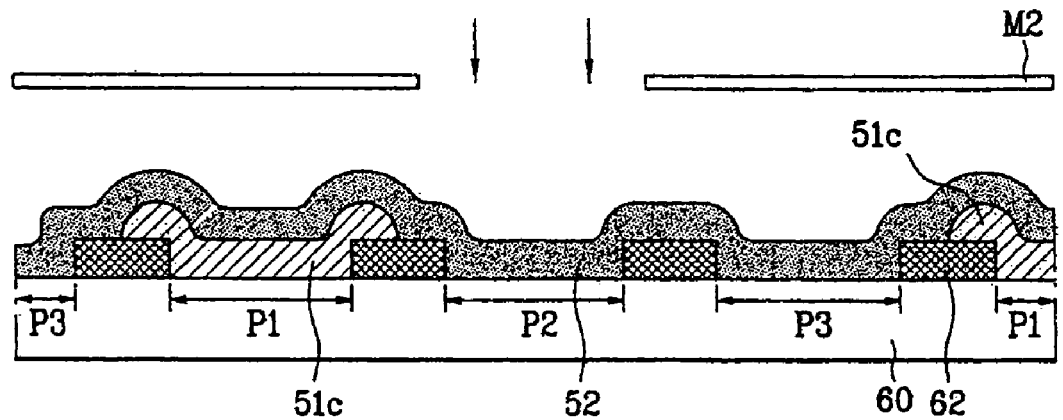

As shown in FIG. 5D, a second color resin 52 may be coated on the entire surface of the substrate 60. Then, a second mask M2 may be positioned above the second color resin 52, and UV rays may be irradiated onto the second color resin 52 through the second mask M2 to selectively expose the second color resin 52. In particular, the second mask M2 may include opening portions corresponding to the first region P2. The opening portions may have a width larger than a width of the first region P2.

Figure 5E:
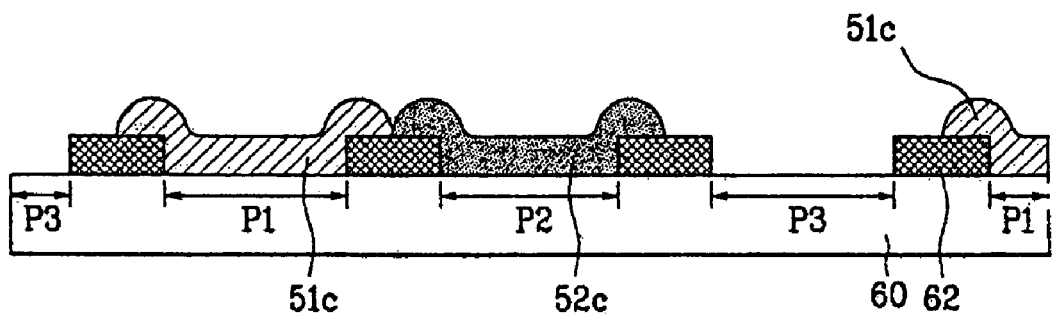

As shown in FIG. 5E, portions of the second color resin 52 (shown in FIG. 5D) may be selectively removed to form the color filter 52c in the first region P2. In particular, the color filter 52c may overlap with the black matrix layer 62 and may extend to a center of the black matrix layer 62.

Further, the color filter 52c may contact the neighboring color filter 51c formed in the first region P1 on the black matrix layer 62.

Figure 5F:
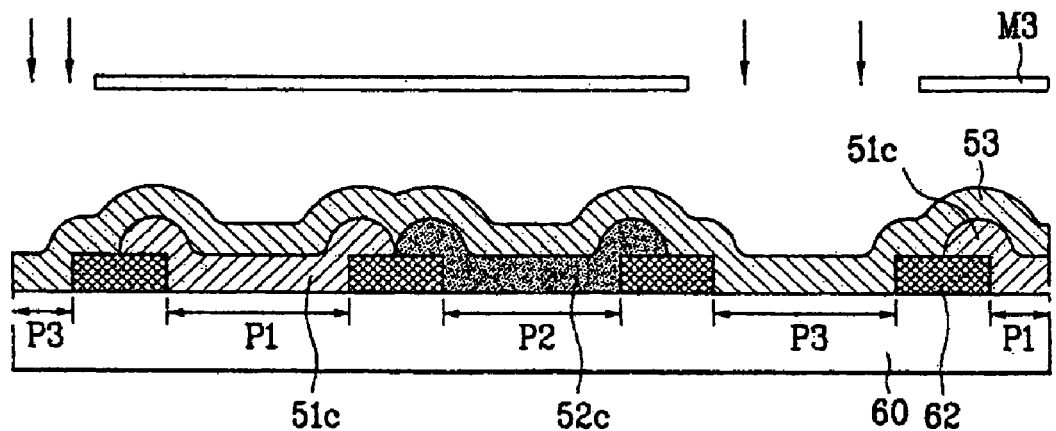

As shown in FIG. 5F, a third color resin 53 may be coated on the entire surface of the substrate 60. Then, a third mask M3 may be positioned above the third color resin 53, and UV rays may be irradiated onto the third color resin 53 through the third mask M3 to selectively expose the third color resin 53. In particular, the third mask M3 may include opening portions corresponding to the first region P3. The opening portions may have a width larger than a width of the first region P3.

Figure 5G:
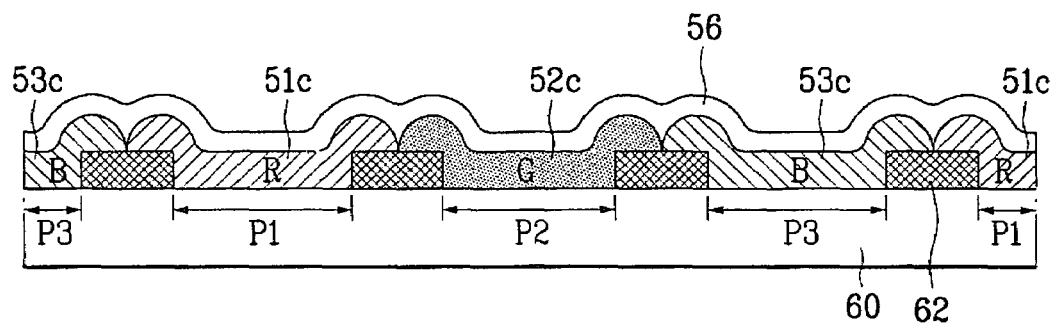
Figure 5H:
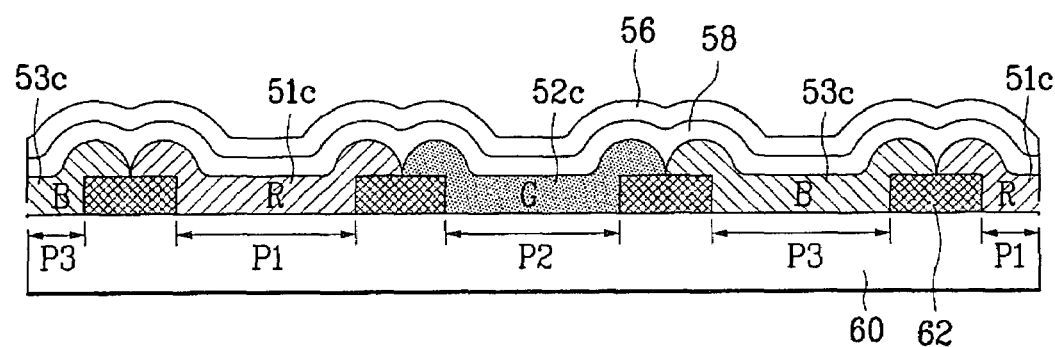
Figure 5I:
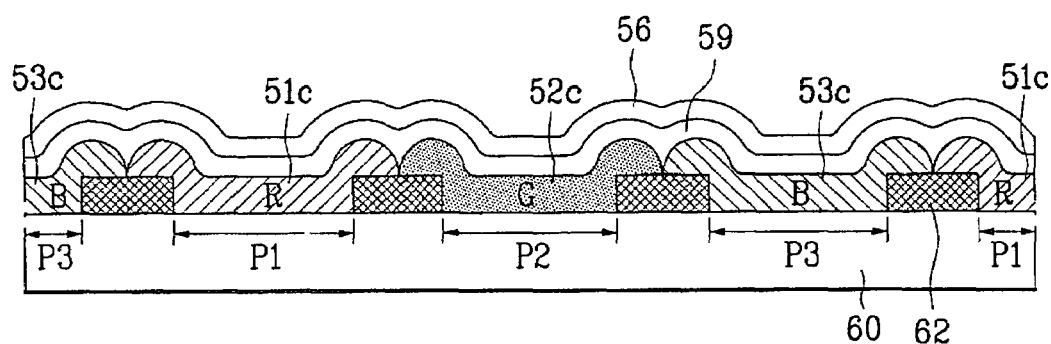

As shown in FIG. 5G, portions of the third color resin 53 (shown in FIG. 5F) may be selectively removed to form the color filter 53c in the first region P3. In particular, the color filter 53c may overlap with the black matrix layer 62 and may extend to a center of the black matrix layer 62. Further, the color filter 53c may contact the neighboring color filter 51c and the neighboring color filter 52c formed in the first region P1 and P2 on the black matrix layer 62. As a result, the color filters 51c, 52c, and 53c may contact with one another at the centers of the black matrix layer 62, thereby decreasing a step coverage between the color filters. Further, an alignment layer 56 may be formed on a more even surface over the color filters 51c, 52c and 53c. In an exemplary embodiment, a common electrode 58 may be first formed on the substrate 60 covering the color filters 51c, 52c and 53c, and the alignment layer 56 may then be formed on the substrate 60 covering the common electrode 58 as shown in FIG. 5H. Alternatively, instead of the common electrode, an overcoating layer 59 may be formed between the color filters 51c, 52c, and 53c and the alignment layer 56 as shown in FIG. 5I. Alternatively, instead of the common electrode, an overcoating layer (not shown) may be formed between the color filters 51c, 52c, and 53c and the alignment layer 56.

Accordingly, the LCD device according to an embodiment of the present invention has first color filters in first regions and second color filters on the black matrix layer, thereby reducing the step coverage between the color filters, minimizing the step coverage of the alignment layer formed thereon, and simplifying the rubbing process of the alignment layer. The LCD device according to another embodiment of the present invention has color filters contacting each other on the black matrix layer, thereby reducing the step coverage between the color filters, minimizing the step coverage of the alignment layer formed thereon, and simplifying the rubbing process of the alignment layer.

It will be apparent to those skilled in the art that various modifications and variations can be made in the liquid crystal display device and the method for fabricating the same of the present invention without departing from the sprit or scope of the invention. Thus, it is intended that the present invention covers the modifications and variations of this invention provided they come within the scope of the appended claims and their equivalents.

What is claimed is:

1. A method for fabricating a liquid crystal display (LCD) device, comprising:
preparing a substrate including a plurality of first regions and second regions, the first and second regions not overlapping each other;
forming a black matrix layer on the substrate in the second regions;
forming a plurality of color filters in the first regions and overlapping the black matrix layer, adjacent color filters contacting one another without overlapping each other on the black matrix layer; and
forming a common electrode layer directly on the color filter layers.

2. The method according to claim 1, wherein the adjacent color filter layers contact one another at a center of an area between the adjacent first regions.

3. The method according to claim 1, further comprising forming an alignment layer on an entire surface of the substrate including the color filter layers.

4. The method according to claim 1, further comprising:
forming an alignment layer on the common electrode.

5. A liquid crystal display (LCD) device, comprising:
a first substrate including a plurality of first regions and second regions, the first and second regions not overlapping each other;
a black matrix layer formed on the first substrate in the second regions;
a plurality of first color filter layers formed in the first regions and overlapping edges of the black matrix layer, the first color filter layers include at least a red color filter, a green color filter, and a blue color filter; and
a plurality of second color filter layers formed on the centers of the black matrix layer, each of the second color filter layers formed between adjacent first color filter layers, the plurality of second color filter layers not overlapping the plurality of first color filter layers, the second color filter layers include at least a red color filter, a green color filter, and a blue color filter, wherein two first color filter layers and one second color filter layer are formed on the black matrix layer, wherein the first color filter layers and the second color filter layer formed on the black matrix layer are different from each other in color.

6. The LCD device according to claim 1, wherein the second red color filter is formed between the first green color filter and the first blue color filter.

7. The LCD device according to claim 1, wherein the second green color filter is formed between the first red color filter and the first blue color filter.

8. The LCD device according to claim 1, wherein the second blue color filter is formed between the first red color filter and the first green color filter.

9. The LCD device according to claim 1, wherein the first regions correspond to pixel regions of a second substrate, the second substrate being attached to the first substrate.

10. The LCD device according to claim 1, further comprising an alignment layer formed on an entire surface of the first substrate including the first and second color filter layers.

11. The LCD device according to claim 1, further comprising:
a common electrode layer formed on an entire surface of the first substrate including the first and second color filter layers; and
an alignment layer formed on the common electrode.

12. The LCD device according to claim 1, further comprising:
an overcoating layer formed on an entire surface of the first substrate including the first and second color filter layers; and
an alignment layer formed on the overcoating layer.

13. A liquid crystal display (LCD) device, comprising:
a first substrate including a plurality of first regions and second regions, the first and second regions not overlapping each other;
a black matrix layer formed on the first substrate in the second regions;

a plurality of color filter layers formed in the first regions and overlapping the black matrix layer, adjacent color filters contacting one another without overlapping each other on the black matrix layer; and a common electrode layer formed directly on the color filter layers.

14. The LCD device according to claim 13, wherein the adjacent color filter layers contact one another at a center of an area between the adjacent first regions.

15. The LCD device according to claim 13, wherein the color filter layers include red, green, and blue color filters.

16. The LCD device according to claim 13, wherein the first regions correspond to pixel regions of a second substrate, the second substrate being attached to the first substrate.

17. The LCD device according to claim 13, further comprising an alignment layer formed on an entire surface of the first substrate including the color filter layers.

18. The LCD device according to claim 13, further comprising:

an alignment layer formed on the common electrode.

19. A method for fabricating a liquid crystal display (LCD) device, comprising:

preparing a first substrate including a plurality of first regions and second regions, the first and second regions not overlapping each other;

forming a black matrix layer on the first substrate in the second regions;

forming a plurality of first color filter layers in the first regions and overlapping edges of the black matrix layer, the first color filter layers include at least a red color filter, a green color filter, and a blue color filter; and forming a plurality of second color filter layers on the centers of the black matrix layer, each of the second color filter layers being formed between adjacent first color filter layers, the plurality of second color filter layers not overlapping the plurality of first color filter layers, the second color filter layers include at least a red color filter, a green color filter, and a blue color filter, wherein two first color filter layers and one second color filter layer are formed on the black matrix layer, wherein the first color filter layers and the second color filter layer formed on the black matrix layer are different from each other in color.

20. The method according to claim 19, wherein the step of forming the first color filter layers and the step of forming the second color filter layers are performed substantially simultaneously.

21. The method according to claim 19, wherein the step of forming the first color filter layers includes coating a color resin on an entire surface of the first substrate covering the black matrix layer, and patterning the coated color resin to form the first color filter layers.

22. The method according to claim 19, further comprising forming an alignment layer on an entire surface of the first substrate including the first and second color filter layers.

23. The method according to claim 19, further comprising:

forming a common electrode layer on an entire surface of the first substrate including the first and second color filter layers; and forming an alignment layer on the common electrode.

24. The method according to claim 19, further comprising:

forming an overcoating layer on an entire surface of the substrate including the first and second color filter layers; and forming an alignment layer on the overcoating layer.

* * * * *